United States Patent [19]

Yustick

[11] 3,876,974
[45] Apr. 8, 1975

[54] VEHICLE SAFETY BELT SEQUENCE NETWORK

[75] Inventor: Donald W. Yustick, Warren, Mich.

[73] Assignee: Chrysler Corporation, Highland Park, Mich.

[22] Filed: July 31, 1972

[21] Appl. No.: 276,475

[52] U.S. Cl. ........... 340/52 E; 340/278; 307/10 SB; 180/82 C
[51] Int. Cl. ............................................ B60r 21/10
[58] Field of Search ......... 340/52 E, 278; 180/82 C; 307/10 SB; 317/134, 135, 139, 140, 154

[56] References Cited
UNITED STATES PATENTS
2,962,634   11/1960   Griffin ............................ 317/154
3,740,711   12/1973   Bell .................................. 340/52 E
3,748,640   7/1973   Sardo, Jr. ........................ 340/52 E Primary Examiner—Alvin H. Waring
Attorney, Agent, or Firm—Talburtt & Baldwin

[57] ABSTRACT

A logic network responding to a plurality of events relating to occupying and operating a motor vehicle. The network responds to the sequence of events and generates an alarm whenever the normal sequence is altered.

8 Claims, 4 Drawing Figures

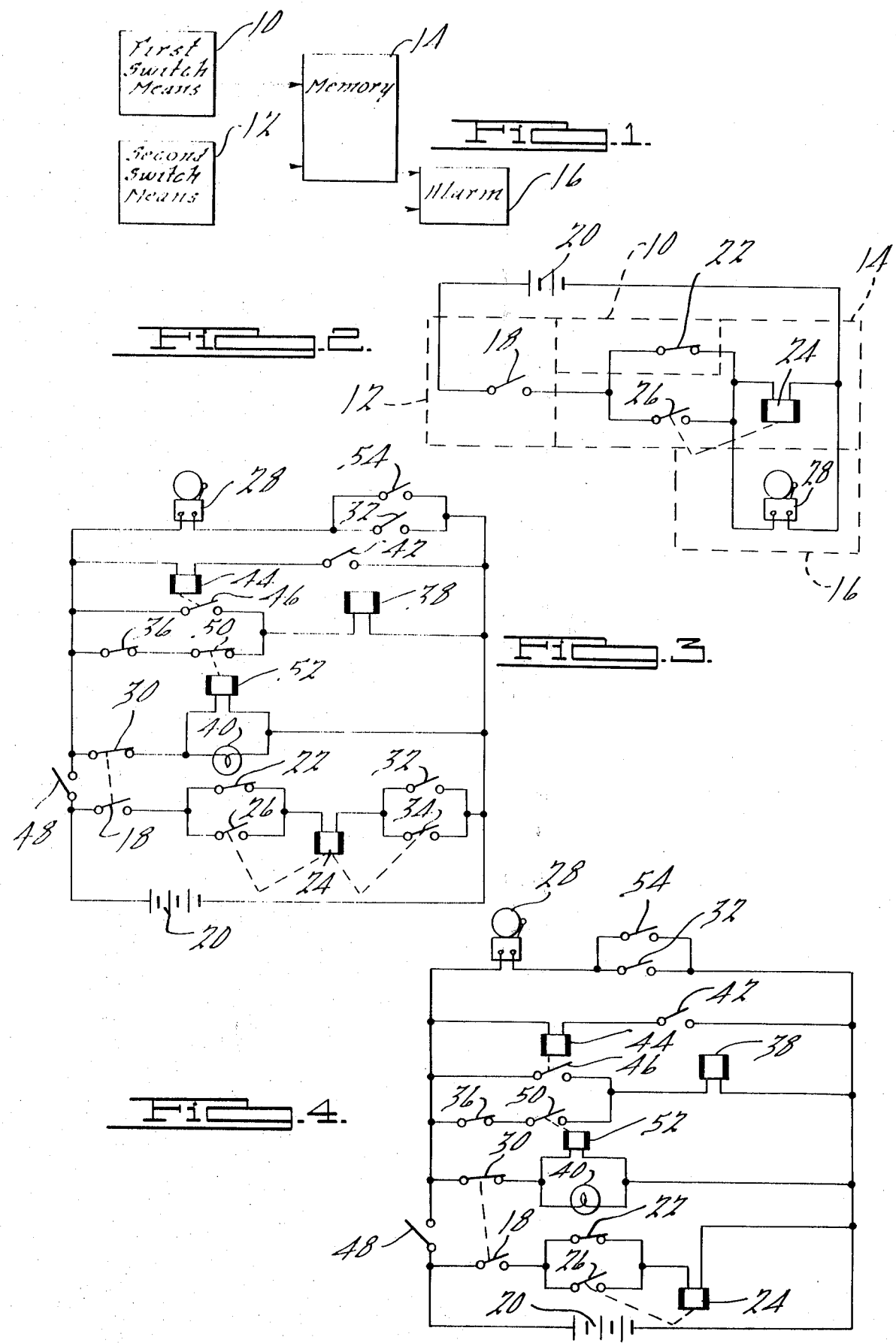

VEHICLE SAFETY BELT SEQUENCE NETWORK

BACKGROUND OF THE INVENTION

1. Field of Invention

This invention relates to sequence logic circuits in general and particularly to alarm interlock networks for use in motor vehicles.

2. Prior Art

In the field of motor vehicle safety, many networks and control systems have been created to inform the occupants of a vehicle that certain personal safety conditions are not met. In some systems, when a seat belt is not fastened a light is illuminated indicating the condition that is not satisfied.

Other networks and control systems in addition to illuminating a light also sound a buzzer when the condition is not satisfied. Some of these systems are operable only when the vehicle is attempted to be started and are inoperative while the vehicle is running.

Other systems are operable for a period of time after the vehicle is running. Many systems provide both an audio alarm and a signal light as a warning to the driver of the vehcile that one or more seat belts are not fastened. Some systems render the alarm inoperative as long as the emergency brake is on or the transmission is in neutral.

In order to improve the meaning of the alarm systems, special responders were operatively coupled to the vehicle seats for selecting only those circuits or seat belt systems which are used by an occupant. These provide integrity to the system by not requiring falsification of non-occupied seats. In each of these systems, all that was required was for each of the switches, responders or sensors to be actuated when the vehicle was started.

SUMMARY OF INVENTION

It is a principal object of this invention to provide a motor vehicle warning system based on a predetermined sequencing of performing safety operations prior to starting a vehicle.

It is an object of this invention to enforce the proper sequence of events.

In accordance with these and other objects which will later become apparent, there is disclosed, described and claimed herein a switch sequence network such as may be used in the safety system of a motor vehicle. A first switch means which may be a normally closed seat switch responsive to the pressure of an occupant on the seat for actuation is normally in a first circuit condition and is operable to be actuated to a second circuit condition. A second switch means which may be a normally opened seat belt switch responsive to the securing of an occupant is normally in said second circuit condition and operable to be actuated to said first circuit condition. An alarm such as a light or buzzer is electrically connected in circuit with said first and second switch means and is responsive to said second switch means being actuated prior to said first switch means. A memory means such as a relay is responsive to said second switch means being actuated prior to said first switch means and is operable to maintain said alarm means until said second switch means is reactuated after said first switch means is actuated.

DESCRIPTION OF DRAWINGS

The above enumerated objects and other objects will become apparent in the following detailed description and accompanying drawings in which:

FIG. 1 is a block diagram of the switch sequence system;

FIG. 2 is a circuit schematic of the system of FIG. 1;

FIG. 3 is a schematic illustrating the incorporation of the circuit of FIG. 2 in a vehicle seat and seat belt alarm system;

FIG. 4 is a modification of the system of FIG. 3.

DETAILED DESCRIPTION

Referring to the figures by the character of reference, there is illustrated in FIG. 1 a block diagram of the switch sequencing network to be described and claimed herein. The elements of the network are a first switch means 10, a second switch means 12, a memory 14, and an alarm means 16.

The first switch means 10 is normally in a first circuit condition and is operable to be actuated to a second circuit condition which is opposite the first condition. For example, the first switch means 10 may be a normally closed switch or conductive element in its first circuit condition and is operable to be actuated to an open condition or non-conductive state in its second circuit condition.

The second switch means 12 is normally in said second circuit condition and is operable to be actuated to the first circuit condition. In a similar manner, a second switch means 12 may be a normally open switch or non-conductive element in its second circuit condition and operable to be actuated to a closed condition or conductive state in its first circuit condition.

A memory 14 is responsive to each of said first and second switch means and stores or remembers the circuit condition of each of said first and second switch means. In the present embodiment, the memory functions to remember the sequence of operations of said first switch means 10 and said second switch means 12.

An alarm means 16 is electrically connected in circuit and is responsive to said first switch means 10 and said second switch means 12 and to said memory means 14 for indicating when the sequence of operations of said first switch means 10 and said second switch means 12 is other than a predetermined sequence of operation. The alarm means 16 may be any form of visual or audio warning or alarm including a disruptive type of alarm wherein another electrical circuit is rendered non conductive in response to the alarm.

The block diagrammatic form of the sequencing system of FIG. 1 is illustrated in a circuit schematic in FIG. 2. The second switch means 12 is indicated as a normally opened switch 18 and is electrically connected to one terminal of the battery 20. The first switch means 10 is illustrated as a normally closed switch 22 and is electrically connected to the normally open switch 19 of said second switch means 12. The memory 14 in the embodiment illustrated in FIG. 2 comprises a relay having its coil 24 electrically connected in series with said normally closed switch 22 of said first switch means 10, one terminal of said relay coil 24 being electrically connected to switch 22 and the other terminal of said relay coil to the other terminal of the battery 20. A normally open contact 26 of said relay is electrically connected in parallel with said normally closed switch 22 of said first switch means 10. The alarm means 16 which in FIG. 2 is illustrated as a buzzer 28 is electrically connected in parallel with the relay coil 24 of the memory 14.

The circuit of FIG. 2, illustrated in its normal state, is an open circuit inasmuch as the second switch means 12 is a normally open switch 18. Upon actuation of the normally open switch 18, without actuation of the normally closed switch 22 of said first switch means 10, the electrical power of the battery 20 will be supplied to the coil 24 of the relay and to the buzzer 28 thereby energizing both units. When the relay coil 24 is energized, its normally open contact 26 will close providing a second conductive path to maintain the power to the relay coil 24 and the buzzer 28. If the first switch means 10 is actuated, the circuit will not be disconnected inasmuch as the relay coil 24 through the relay contact 26 will be connected to receive power for maintaining the energization of the relay coil 24. In order to turn off the buzzer 28, it will be necessary to de-actuate the second switch means 12 returning said normally open switch 18 to its normal condition thereby removing the power from the relay coil 24 and the buzzer 28. This opens the normally open contact 26 of the relay, after which the second switch means 12 may be reactuated, and provided that the first switch means 10 is still actuated, neither the relay coil 24 nor the buzzer 28 will be connected to the battery and therefore will not be energized.

The operation of FIG. 2 must be in a predetermined sequence or otherwise the alarm 16 will sound. This operation is that the first switch means 10 (normally closed switch 22) must be actuated (opened) before the second switch means 12 (normally open switch 18) is actuated (closed). If the sequence is not completed in this manner, the relay coil 24 will become energized and the buzzer 28 will sound. Once the buzzer 28 is sounded, the second switch means 12 must be de-actuated to stop the buzzer. Once the first switch means is actuated with the second switch means de-actuated, the buzzer is prevented from again sounding.

As a modification of FIG. 2, the relay coil 24 may have an additional normally open contact thereon, not shown, which when operated will electrically connect the buzzer 28 to the battery 20. In this manner the buzzer 28 is not directly connected in parallel with the relay coil 24 but is electrically connected in a different circuit.

Referring to FIG. 3, there is illustrated a seat belt vehicle interlock system using the sequence switch system of FIG. 2. In this circuit, the first switch means 10 is represented by the normally closed seat switch 22 which is responsive to the weight of a person or individual occupying the seat in the vehicle. The second switch means 12 comprises a normally open seat belt switch 18 which is responsive to the fastening of the belt such as by the belt latch mechanism or to a predetermined amount of length of belt being removed from a stored or retracted position. Additionally, in the system of FIG. 3 there is a second seat belt switch which is a normally closed switch 30 and is responsive in a similar manner as the previously identified seat belt switch 18 to the securing of the seat belt.

In circuit with the seat switch 22 and the seat belt switch 18, there is connected the memory or storage relay coil 24. The other end of the relay coil is connected through a normally open door switch 32 to one terminal of the battery 20. The seat belt switch 18 is electrically connected to the other terminal of the battery 20. Therefore, in FIG. 3, the sequencing switch network is not initially operative when the vehicle door is closed but if actuated when the door is open, the memory will be maintained when the door is reclosed. For reasons of clarity, the door switch 32 is shown as two separate switches in FIG. 3.

The memory relay has three contacts 26, 34 and 36 responsive thereto. The first is a normally open contact 26 in parallel with the seat switch 22 and functions to provide the alternate circuit path around the seat switch when the predetermined sequencing order is violated. The second is a normally open switch 34 connected in parallel with the door switch 32 and will maintain the circuit once it is actuated and the door is closed. The third is a normally closed contact 36 and functions in an interrupt mode to interrupt, namely prevent, the energizing of the starter relay 38 for starting the vehicle.

Additionally, the system of FIG. 3 provides a circuit through the normally closed belt switch 30 which is responsive to the fastening of the seat belt for illuminating a warning light 40 if the belts are not fastened. An additional circuit shown in FIG. 3 is responsive to a switch 42 on the oil pressure gauge for energizing a time delay relay 44 which will allow restart within a predeterimined period of time after the initial start. A normally open contact 46 from the time delay relay is connected in parallel with the normally closed contact 36 from the memory relay coil 24 controlling the starting relay 38 circuit. The above enumerated circuits, namely, the fastened seat belt light circuit, the starter relay circuit, and the time delay relay circuit are all controlled by an ignition key switch 48 inside the vehicle. In the present embodiment these circuits are enregized only when the vehicle is started or run as evidenced by a key in the ignition switch 48.

The time delay relay 44 and its contact 46 will maintain the electrical path to the starter relay 38 for a period of time after the engine has stopped. This will allow the driver to leave the vehicle for a very short periof of time, return and start the vehicle regardless of the state of the sequencing circuit.

In the circuit of FIG. 4 there is a safety belt sequence interlock system similar to that of FIG. 3. In FIG. 4 the sequence circuit is not interlocked with the door; otherwise the operation is identical to FIG. 3.

The purpose of either system of FIG. 3 or FIG. 4 is to prevent the driver and/or the passengers in the vehicle from merely fastening their seat belts prior to entering the vehicle and then sitting on them. In each of these control systems, the driver and the passengers must be sitting in their seats and then fasten their seat belts. If this order is not followed, then the vehicle will not start when the key is inserted in the ignition switch 48. If the belt is fastened prior to the driver or passenger entering the vehicle, the normally open belt switch 18 closes and if the door is open in FIG. 3, the memory relay coil 24 is energized. With this relay energized, the circuit to the starter relay 38 from the ignition switch 48 is open by virtue of the normally closed contact 36 on the relay. The normal operation is for the driver or passenger to get into the vehicle and sit on the seat thereby actuating the normally closed seat switch 22 into an open position. Once the individual is in the seat and the belt is fastened or secured, the operator or driver may start the vehicle.

In electrical series with the starter relay 38 is contact 36 representing the memory circuit of the sequencer indicating whether the proper sequence of operations was performed and contact 50 from the relay 52 responsive to the second seat belt switch 30 and the fastening of the seat belt. This relay 52 is responsive to the normally closed seat belt switch 30 which is opened when the seat belt is fastened. Thus it is seen that the vehicle may be started when the seat switch 22 is actuated and the seat belt is fastened in the proper sequence, or if the car has already been running, the time delay relay 44 will provide a short period of time in which to restart the car after it has been stopped. It is noted that all of these warnings and controls are under the control of the ignition switch 48 and are responsive to a key being inserted into the ignition switch, with the exception of the sequencing circuit which will function whether or not a key is in the ignition switch.

In the circuits of FIGS. 3 and 4 there is also illustrated an alarm circuit having a buzzer 28 which is responsive to the key placed in the ignition switch 48 and to an additional normally open contact 54 of the memory relay. In addition, the buzzer 28 will sound whenever the door is opened and a key is in the ignition switch 48.

It is obvious that in each of the above circuits, the necessary seat and seat belt switches for the other occupant positions, other than the driver which has been described, may be added. Each of these new circuits will function and control in the same manner as the driver's circuit.

Thus, there has been shown and described a switch sequencing network, and in particular the utilization of said network in a vehicle safety belt sequencing interlock system where a vehicle is rendered inoperative to be started, unless and until, a certain sequence of operations are performed relative to the fastening of the seat belt around the driver and his occupants.

What is claimed is:

1. In a vehicle having an electrical power supply, a seat for an occupant of the vehicle, and a safety belt for the occupant of the seat, which safety belt is operative to fastened and unfastened conditions, a safety system for providing to a device on the vehicle a control signal indicative of fastening of the safety belt prior to occupancy of the seat, said system comprising:
   a seat switch means operatively associated with the seat to be closed when the seat is unoccupied and to be open when the seat is occupied;
   a safety belt switch means operatively associated with the safety belt to be open when the safety belt is in the unfastened condition and to be closed when the safety belt is in the fastened condition;
   a normally de-energized control element adapted to be energized with electrical energy from the electrical power supply and to provide said control signal when energized;
   means for operatively coupling said seat switch means, said safety belt switch means and said control element in series circuit across the electrical power supply;
   a controlled circuit element under the control of said control element for operation to a closed condition when said control element is energized and to an open condition when said control element is de-energized;
   means for operatively coupling said controlled circuit element in parallel circuit with said seat switch means; and
   means for operatively coupling the vehicle device with said control element such that said control signal is supplied to the vehicle device when said control element is energized.

2. A system according to claim 1 wherein the vehicle device is an alarm.

3. A system according to claim 1 wherein the vehicle further includes a starting system adapted to be energized from the power supply and an ignition switch adapted to energize the starting system from the power supply when the vehicle is to be started, said safety system further comprising:
   a second controlled element under the control of said control element for operation to an open condition when said control element is energized and to a closed condition when said control element is de-energized; and
   means for operatively coupling said second controlled element, said ignition switch and said starting system in series circuit across the power supply.

4. A system according to claim 1 wherein said control element comprises a relay coil and said controlled circuit element comprises a set of contacts operatively associated with said relay coil.

5. In a vehicle having an electrical power supply, a seat for an occupant of the vehicle and a safety belt for the occupant of the seat, which safety belt is operative to fastened and unfastened conditions, a safety system for providing to a device on the vehicle a control signal in response to fastening of the seat belt prior to occupancy of the seat, said system comprising:
   a seat switch means operatively associated with the seat to operate to a normal condition when the seat is unoccupied and to an actuated condition when the seat is occupied;
   a safety belt switch means operatively associated with the safety belt to operate to a normal condition when the safety belt in unfastened and to an actuated condition when the safety belt is fastened;
   a control element operable to energized and de-energized states and providing said control signal when in a selected one of said two states;
   means for operatively coupling said control element and said two switch means in circuit with the electrical power supply such that said control element operates to the other of said states when both said swtich means are in their respective normal conditions and remains in said other state when only said seat switch means of said two switch means operates to its actuated condition, but operates to said one state when only said safety belt switch means of said two switch means operates to its actuated condition;
   a controlled circuit element under the control of said control element for operation to a normal condition when said control element is in said other state and to an actuated condition when said control element is in said one state;
   and means for operatively coupling said controlled circuit element in circuit with said control element and said two switch means such that when only said safety belt switch means of said two switch means operates to its actuated condition, said controlled circuit element and said safety belt switch means maintain said control element in said one state irrespective of the subsequent condition of said seat switch means.

6. A system according to claim 5 wherein said control element comprises a relay coil which, when energized, provides said control signal.

7. A system according to claim 5 wherein one of said two switch means comprises a normally open switch and the other of said two switch means comprises a normally closed switch.

8. A system according to claim 7 wherein said normally open switch and said normally closed switch are connected in series circuit with each other and said controlled element is connected in parallel with said normally closed switch.

* * * * *